US011325202B2

(12) United States Patent
Qin et al.

(10) Patent No.: US 11,325,202 B2
(45) Date of Patent: May 10, 2022

(54) SYSTEM AND METHOD FOR MEASURING ENERGY CONVERSION EFFICIENCY OF INERTIA FRICTION WELDING MACHINE

(71) Applicant: Shandong University, Jinan (CN)

(72) Inventors: Guoliang Qin, Jinan (CN); Fan Yang, Jinan (CN); Da Zhang, Jinan (CN)

(73) Assignee: Shandong University, Shandong (CN)

( * ) Notice: Subject to any disclaimer, the term of this patent is extended or adjusted under 35 U.S.C. 154(b) by 16 days.

(21) Appl. No.: 16/941,263

(22) Filed: Jul. 28, 2020

(65) Prior Publication Data
US 2021/0031295 A1 Feb. 4, 2021

(30) Foreign Application Priority Data
Aug. 2, 2019 (CN) .......................... 201910712144.2

(51) Int. Cl.
*B23K 20/12* (2006.01)
*B23K 20/06* (2006.01)
*G05B 19/404* (2006.01)
(52) U.S. Cl.
CPC .............. *B23K 20/12* (2013.01); *B23K 20/06* (2013.01); *G05B 19/404* (2013.01); *G05B 2219/45146* (2013.01)
(58) Field of Classification Search
CPC ...... B23K 20/06; B23K 20/121; B23K 20/26; B23K 31/125; B23K 20/122;
(Continued)

(56) References Cited

U.S. PATENT DOCUMENTS 3,680,760 A * 8/1972 Costa ................... B23K 20/121
228/2.3
4,468,265 A * 8/1984 MacLaughlin ......... B29C 66/87
156/64
(Continued)

FOREIGN PATENT DOCUMENTS

CN 108907447 A 11/2018
CN 208736891 U 4/2019

OTHER PUBLICATIONS

CN Application No. 201910712144.2, First Office Action, dated Mar. 2, 2020, Original Chinese and English Translation.
(Continued)

*Primary Examiner* — Kiley S Stoner
(74) *Attorney, Agent, or Firm* — Paul C. Oestreich; Eminent IP, P.C.

(57) ABSTRACT

The present disclosure provides a system and method for measuring energy conversion efficiency of an inertia friction welding (IFW) process in a non-contact manner. The system includes an IFW machine, a Hall sensor, a data acquisition module, a processing module and a stabilized direct current (DC) power supply. The stabilized DC power supply provides electrical energy for the Hall sensor. The Hall sensor is provided beside a flywheel of the IFW machine, so that the flywheel is within a detection range of the Hall sensor. A magnet is provided on the flywheel. The data acquisition module acquires a Hall electric potential change caused by a relative movement between the magnet and the Hall sensor during the IFW process, and transmits the Hall electric potential change to the processing module to calculate the energy conversion efficiency of the IFW machine.

17 Claims, 1 Drawing Sheet

(58) Field of Classification Search
CPC ......... B23K 20/12–1215; B23K 20/129–1295; G05B 19/404; G05B 2219/45146; G01L 3/26; B29C 65/06–0663
USPC ............. 228/112.1–114.5, 2.1–2.3; 156/73.5
See application file for complete search history.

(56) References Cited

U.S. PATENT DOCUMENTS

| | | | | |
|---|---|---|---|---|
| 5,833,127 | A * | 11/1998 | Powell | B29C 66/92653 228/102 |
| 2005/0218192 | A1* | 10/2005 | Lovin | B23K 20/12 228/113 |
| 2006/0037993 | A1* | 2/2006 | Kyriakoglou | B23K 20/121 228/113 |
| 2009/0112488 | A1* | 4/2009 | Haberl | G05B 19/404 702/41 |
| 2016/0228979 | A1* | 8/2016 | Bray | B23K 20/1205 |
| 2018/0147656 | A1* | 5/2018 | Zhang | B23K 20/121 |
| 2019/0129373 | A1* | 5/2019 | Skogsrud | H02P 23/20 |
| 2020/0361023 | A1* | 11/2020 | Nakagawa | B23K 11/0935 |

OTHER PUBLICATIONS

Ho De Fu, Introduction to Welding and Joining Engineering, Shanghai Jiao Tong University Press, Dec. 31, 1998, Original Chinese only.

* cited by examiner

SYSTEM AND METHOD FOR MEASURING ENERGY CONVERSION EFFICIENCY OF INERTIA FRICTION WELDING MACHINE

CROSS-REFERENCE TO RELATED APPLICATIONS

This US non-provisional patent application claims benefit and priority to Chinese (CN) Patent Application No. 201910712144.2, filed, Aug. 2, 2019, pursuant to the Paris Convention and 35 U.S.C. § 119, the contents of which are incorporated herein by reference for all purposes as if fully set forth herein.

TECHNICAL FIELD

The present disclosure belongs to the technical field of research on the inertia friction welding (IFW) process, and relates to a system and method for measuring energy conversion efficiency of an IFW process in a non-contact manner.

BACKGROUND

This part is merely intended to provide background information related to the present disclosure, and does not necessarily constitute prior art.

The energy conversion efficiency has an important influence on the inertia friction welding (IFW) process, and directly affects the heat input in the joint during the welding process. The measurement of the energy conversion efficiency lays a good foundation for the numerical simulation and joint quality control in the IFW process.

At present, the friction power and energy conversion efficiency of the friction interface during the welding processes such as continuous drive friction welding (CDFW) and linear friction welding (LFW) are mostly calculated by measuring the voltage and current of the major motor (VCMM). That is, the input power of the motor is calculated by measuring the VCMM under no load and load, respectively, and the physical parameters such as friction heating power and energy conversion efficiency in the welding process are calculated accordingly. Before the IFW starts, the major motor is connected to the spindle and flywheel through a clutch and drives them to rotate to reach up to the preset speed, thus storing kinetic energy in the rotating flywheel and spindle. After the welding process starts, the major motor is disconnected from the flywheel and spindle, and the kinetic energy stored in the flywheel is converted into frictional heat energy of the interface under the action of friction pressure. Because the major motor is disconnected from the spindle and the flywheel, the VCMM method cannot be used to measure the physical parameters in the welding process. In addition, the energy conversion efficiency can be calculated by using a dynamic torque sensor to detect the torque of the friction interface. However, it is necessary to change the structure of the IFW machine to connect the dynamic torque sensor and the spindle by a coupling, which increases manufacturing and maintenance costs.

SUMMARY

In order to solve the above problems, the present disclosure provides a system and method for measuring energy conversion efficiency of an inertia friction welding (IFW) process in a non-contact manner. The present disclosure has low cost and does not need to change the structure of the existing IFW machine. The present disclosure measures the real-time rotational speed, the inherent moment of resistance and the energy conversion efficiency of the IFW process of the IFW machine, and provides a basis for the numerical simulation and joint quality control in the IFW process.

According to some examples, the present disclosure adopts the following technical solutions.

A system for measuring energy conversion efficiency of an IFW process in a non-contact manner, including an IFW machine, a Hall sensor, a data acquisition module, a processing module and a stabilized direct current (DC) power supply, where the stabilized DC power supply provides electrical energy for the Hall sensor; the Hall sensor is provided beside a flywheel of the IFW machine, so that the flywheel is within a detection range of the Hall sensor; a magnet is provided on the flywheel; the data acquisition module acquires a Hall electric potential change caused by a relative movement between the magnet and the Hall sensor during the IFW process, and transmits the Hall electric potential change to the processing module to calculate the energy conversion efficiency of the IFW machine.

As an alternative implementation, the magnet is attached to the flywheel of the IFW machine.

As an alternative implementation, the IFW machine includes a first drive mechanism, a second drive mechanism, a rotating spindle and a flywheel; the first drive mechanism drives the rotating spindle to rotate; the rotating spindle drives the flywheel to rotate, thereby driving a rotary end weldment coaxial with the flywheel to rotate; the second drive mechanism is able to drive a mobile end weldment to move relatively along an axis of the rotating spindle.

As a further limitation, a clutch and a brake are provided on the rotating spindle and a front end of the flywheel, respectively.

As a further limitation, the magnet is movably provided on a side surface of the flywheel.

As a possible implementation, the first drive mechanism is mainly to drive the rotating spindle to rotate by a motor, and the second drive mechanism is to drive a mobile end toward a rotary end by a hydraulic servo.

A working method based on the above system, including: disposing a Hall sensor beside a flywheel of an IFW machine, so that the flywheel is within a detection range of the Hall sensor; disposing a magnet on the flywheel to enable the IFW machine to work; allowing a data acquisition module to acquire a Hall electric potential change caused by a relative movement between the magnet and the Hall sensor during the IFW process; and enabling a processing module to calculate the energy conversion efficiency of the IFW machine based on the acquired data.

As an alternative implementation, a calculation process includes:
calculating kinetic energy stored in the flywheel according to a moment of inertia and a speed of the flywheel of the IFW machine.

As an alternative implementation, the calculation process further includes: controlling the flywheel of the IFW machine to accelerate to a specified speed, and reducing the speed of the flywheel to 0 in a no-load state; running an electrical parameter acquisition program to acquire an electrical signal from the Hall sensor; processing and extracting an acquired electrical parameter, and calculating a speed function $N_0(t)$ of the flywheel under no load and a time $t_0$ when the speed of the flywheel drops to 0 under no load; and calculating an inherent moment $M_0$ of resistance of the IFW machine according to the law of conservation of energy.

As an alternative implementation, the working method further includes:
monitoring an instantaneous speed of the flywheel of the IFW machine during the welding process under preset friction pressure, speed and moment of inertia; calculating a speed function N(t) of the flywheel during the welding process and a time t when the speed of the flywheel drops to 0; calculating the work done by the inherent moment of resistance of the IFW machine during the welding process according to N(t) and t; and calculating the energy conversion efficiency during the welding process according to the work done by the inherent moment of resistance during the welding process and the energy stored in the flywheel.

A computer-readable storage medium storing a plurality of instructions, the instructions being suitable for being loaded by a processor of a terminal device and executing the calculation process.

A terminal device, including a processor and a computer-readable storage medium, where the processor is used to implement each instruction; the computer-readable storage medium is used to store a plurality of instructions, the instructions being suitable for being loaded by the processor and executing the calculation process.

Compared with the prior art, the present disclosure has the following beneficial effects:

The present disclosure realizes the non-contact measurement of the energy conversion efficiency of the IFW process without changing the original structure of the IFW machine, achieving low cost and simple operation.

The present disclosure uses a processor to realize the accurate, automatic measurement of the physical parameters of the IFW process.

BRIEF DESCRIPTION OF DRAWINGS

The accompany drawings of the specification constitute part of the present disclosure and are intended to help further understanding of the present disclosure. The schematic examples of the present disclosure and description thereof are intended to be illustrative of the present disclosure, rather than to constitute an undue limitation to the present disclosure.

Figure 1:
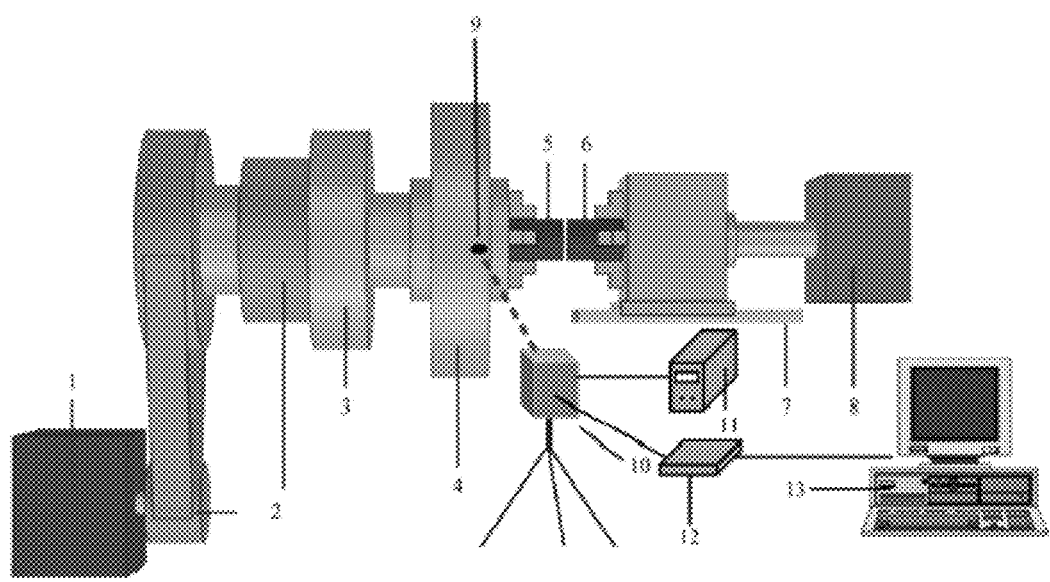
FIG. 1 is a schematic diagram of a system for detecting an inertia friction welding (IFW) process.

Reference Numerals: 1. drive motor; 2. clutch; 3. brake; 4. flywheel; 5. rotary end weldment; 6. mobile end weldment; 7. guide rail; 8. hydraulic system; 9. magnet; 10. Hall sensor; 11. stabilized direct current (DC) power supply; 12. data acquisition board; and 13. computer.

DETAILED DESCRIPTION

The present disclosure is described in further detail below with reference to the accompanying drawings and examples.

It should be noted that the following detailed description is exemplary and aims to further describe the present disclosure. Unless otherwise specified, all technical and scientific terms used herein have the same meaning as commonly understood by one of ordinary skill in the technical field to which the present disclosure belongs.

It should be noted that the terms used herein are merely intended to describe the specific examples, rather than to limit the exemplary examples of the present disclosure. As used herein, the singular form is also intended to include the plural form unless otherwise indicated obviously from the context. Furthermore, it should be further understood that the terms "include" and/or "comprise" used in this specification specify the presence of stated features, steps, operations, elements, components and/or a combination thereof.

As mentioned in the background, at present, physical parameters such as friction heating power and energy conversion efficiency in the continuous drive friction welding (CDFM) process and linear friction welding (LFW) process are mostly calculated by measuring the voltage and current of major motor (VCMM). However, for inertia friction welding (IFW), because the major motor is disconnected from the spindle and the flywheel when the welding process starts, the VCMM method cannot be used to measure the physical parameters in the welding process. In addition, if the physical parameters in the welding process are measured by using a dynamic torque sensor, it is necessary to change the structure of the IFW machine, resulting in high costs. In view of the above, the present disclosure proposes a system and method for measuring a physical parameter of an IFW process in a non-contact manner.

A system for measuring a physical parameter of an IFW process in a non-contact manner, including:
an IFW machine;
a magnet attached to a flywheel of the IFW machine;
a Hall sensor provided beside the flywheel of the IFW machine and covering the flywheel in an effective detection range thereof;
a stabilized direct current (DC) power supply configured to connect the Hall sensor and provide power for the Hall sensor;
a data acquisition board connected with the Hall sensor and configured to acquire an electrical parameter; and
a computer configured to process the acquired electrical parameter and calculate the corresponding physical parameter of the IFW process.

The magnet is attached to the flywheel of the IFW machine. The Hall sensor is provided beside the flywheel and covers the flywheel in a detection range thereof. The stabilized power supply is used to provide power for the Hall sensor. When the magnet on the flywheel is close to the Hall sensor, a magnetic field in the Hall sensor changes. Due to the Hall effect, different Hall electric potentials are generated. That is, when the magnetic is close to the Hall sensor, the Hall sensor outputs a high electric potential, and when the magnetic is far from the Hall sensor, the Hall sensor outputs a low electric potential. The Hall sensor is connected to the data acquisition board.

When a moment of inertia I and a speed n of the flywheel of the IFW machine are input, the system automatically calculates kinetic energy $E_0$ stored in the flywheel and stores $E_0$.

The flywheel is accelerated to a constant speed under no load. When the flywheel is disconnected from the driving motor, the Hall sensor is used to acquire a magnetic signal, and a program is used to process and extract an acquired electrical parameter. The effective detection range of the Hall sensor is $\Delta l$, and a high potential output time is $\Delta t$. Based on the two parameters, an instantaneous speed $$v = \frac{\Delta l}{\Delta t}$$

of the flywheel is calculated. The system automatically calculates a fitting function $N_0(t)$ of a speed curve of the flywheel under no load and a time $t_0$ when the speed of the flywheel drops to 0, and then stores $N_0(t)$ and $t_0$. The resistance of the IFW machine is regarded as constant. Assuming that there is a constant moment $M_0$ of resistance acting on a spindle and the flywheel, the work done by the frictional moment of resistance is calculated based on the fitting function $N_0(t)$ of the speed curve of the flywheel under no load and the time $t_0$ when the speed of the flywheel drops to 0 as follows:

$$W_0 = M_0\theta = M_0 \int_0^{t_0} 2\pi N_0(t)\,dt.$$

According to the law of conservation of energy:

$$M_0 = \frac{\frac{1}{2}I\omega_0^2}{\int_0^{t_0} 2\pi N_0(t)\,dt}.$$

In this way, the inherent moment $M_0$ of resistance of the IFW machine is calculated and stored.

The Hall sensor and a data acquisition and post-processing program are used to measure an instantaneous speed of the flywheel during the welding process and a time t when the speed of the flywheel drops to 0. Then a speed function $N(t)$ of the flywheel during the welding process is calculated and stored. According to the speed function $N(t)$ of the flywheel during the welding process, t and the inherent moment $M_0$ of resistance measured by the system, the work done by the inherent moment of resistance of the IFW machine in the welding process is automatically calculated as follows:

$$W = M_0\theta = M_0 \int_0^t \frac{2\pi N(t)}{60}\,dt.$$

W is stored.

According to the work done by the inherent moment of resistance in the welding process and the energy stored in the flywheel, the system automatically calculates the energy conversion efficiency of the IFW process as follows:

$$\eta = 1 - \frac{W}{E_0}.$$

The energy conversion efficiency is stored.

As a specific example, as shown in FIG. 1, the IFW machine includes a first drive mechanism (a motor in FIG. 1), a second drive mechanism (a hydraulic system in FIG. 1), a rotating spindle and a flywheel. The first drive mechanism drives the rotating spindle to rotate. The rotating spindle drives the flywheel to rotate, thereby driving a rotary end weldment coaxial with the flywheel to rotate. The second drive mechanism is able to drive a mobile end weldment to move relatively along an axis of the rotating spindle.

A clutch and a brake are provided on the rotating spindle and a front end of the flywheel, respectively.

The magnet is movably provided on a side surface of the flywheel.

When a moment of inertia $I=0.3392$ kg·m² and a speed $n=2000$ rpm of the flywheel of the IFW machine are input, the kinetic energy stored in the flywheel is automatically calculated and stored:

$$E_0 = \frac{1}{2}I\omega_0^2 = 7439.488\,J.$$

Figure 2:
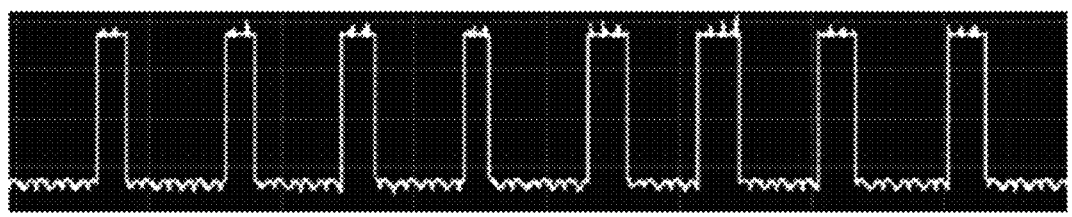
FIG. 2 shows a pulse signal acquired by an electrical parameter acquisition program.

The flywheel of the IFW machine is accelerated to 2000 rpm, and the speed of the flywheel is reduced to 0 under no load. An electrical signal from the Hall sensor is acquired and transmitted to the computer for storage. The acquired pulse signal is shown in FIG. 2. The acquired electrical parameter is processed and extracted, and the speed function of the flywheel under no load is calculated as follows:

$$N_0(t) = -6.5682t^2 - 123.8575t + 2037.16$$

The time $t_0$ when the speed of the flywheel drops to 0 under no load is calculated as 10.54 s. $N_0(t)$ and $t_0$ are stored.

According to the law of conservation of energy, the inherent moment $M_0$ of resistance of the IFW machine is calculated as 5.906 N, and the inherent moment $M_0$ of resistance is stored.

Under the welding process parameters such as friction pressure $P_f=300$ MPa, speed $n=2000$ rpm and moment of inertia $I=0.3392$ kg·m², the instantaneous speed of the flywheel of the IFW machine is monitored, and the speed function of flywheel during the welding process is calculated as follows:

$$N(t) = -1.1882t^5 + 16.4843t^4 - 86.9458t^3 + 215.3248t^2 - 533.3248t + 2003.5510$$

The time t when the speed of the flywheel drops to 0 is calculated as 5.89 s. $N(t)$ and t are stored.

Then according to the measured $N(t)$ and t, the system automatically calculates the work done by the inherent moment of resistance of the IFW machine in the welding process as follows:

$$W = M_0 \int_0^{5.89} \frac{2\pi N(t)}{60}\,dt = 6156.430\,J.$$

According to the work done by the inherent moment of resistance in the welding process and the energy stored in the flywheel, the system automatically calculates the energy conversion efficiency in the IFW process as follows:

$$\eta = 1 - \frac{W_0}{E_0} = 0.49.$$

The energy conversion efficiency is stored.

Of course, the above calculation process can be implemented by a program, and run on a storage medium or a terminal device. Meanwhile, the various parameters of the above examples can be replaced in other examples according to specific conditions. They are not limited to the specific values given in the above examples.

Persons skilled in the art should understand that the examples of the present disclosure may be provided in the form of a method, a system or a computer program product. Therefore, the present disclosure may provide hardware only examples, software only examples or software and hardware combined examples. Moreover, the present disclosure may be described with reference to a computer program product that is implemented on one or more computer-sensitive storage media (including but not limited to a disk memory, a compact disc read-only memory (CD-ROM) and an optical memory) that include computer-sensitive program codes.

The present disclosure is described based on the flowcharts and/or block diagrams of the method, the device (system) and the computer program product according to the examples of the disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to produce a machine, so that the instructions executed by the computer or the processor of any other programmable data processing device produce an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto the computer or another programmable data processing device, so that a series of operations and steps are performed on the computer or the another programmable device, thereby generating computer-implemented processing. Therefore, the instructions executed on the computer or another programmable device provide steps for implementing a specific function in one or more processes in the flowcharts and/or in one or more blocks in the block diagrams. The above is merely illustrative of the preferred examples of the present disclosure and is not intended to limit the present disclosure, and various changes and modifications can be made to the present disclosure by those skilled in the art. Any modifications, equivalent substitutions and improvements made within the spirit and scope of the present disclosure should fall within the protection scope of the present disclosure.

Although the specific examples of the present invention are described above with reference to the accompanying drawings, they are not intended to limit the protection scope of the present invention. Those skilled in the art should understand that any modifications or transformations made by those skilled in the art without creative efforts still fall within the protection scope of the present invention based on the technical solutions of the present invention.

What is claimed is:

1. A system for measuring energy conversion efficiency of an inertia friction welding (IFW) process in a non-contact manner, comprising an IFW machine, a Hall sensor, a data acquisition module, a processing module and a stabilized direct current (DC) power supply, wherein the stabilized DC power supply provides electrical energy for the Hall sensor; the Hall sensor is provided beside a flywheel of the IFW machine, so that the flywheel is within a detection range of the Hall sensor; a magnet is provided on the flywheel; the data acquisition module acquires a Hall electric potential change caused by a relative movement between the magnet and the Hall sensor during the IFW process, and transmits the Hall electric potential change to the processing module to calculate the energy conversion efficiency of the IFW machine; and wherein the magnet is attached to the flywheel of the IFW machine.

2. The system for measuring energy conversion efficiency of an IFW process in a non-contact manner according to claim 1, wherein the IFW machine comprises a first drive mechanism, a second drive mechanism, a rotating spindle and a flywheel; the first drive mechanism drives the rotating spindle to rotate; the rotating spindle drives the flywheel to rotate, thereby driving a rotary end weldment coaxial with the flywheel to rotate; the second drive mechanism is able to drive a mobile end weldment to move relatively along an axis of the rotating spindle.

3. The system for measuring energy conversion efficiency of an IFW process in a non-contact manner according to claim 2, wherein a clutch and a brake are provided on the rotating spindle and a front end of the flywheel, respectively.

4. The system for measuring energy conversion efficiency of an IFW process in a non-contact manner according to claim 1, wherein the magnet is movably provided on a side surface of the flywheel.

5. A working method based on the system according to claim 1, comprising:
  disposing a Hall sensor beside a flywheel of an IFW machine, so that the flywheel is within a detection range of the Hall sensor;
  disposing a magnet on the flywheel to enable the IFW machine to work;
  allowing a data acquisition module to acquire a Hall electric potential change caused by a relative movement between the magnet and the Hall sensor during an IFW process; and
  enabling a processing module to calculate the energy conversion efficiency of the IFW machine based on the acquired data.

6. The working method according to claim 5, wherein a calculation process comprises:
  calculating kinetic energy stored in the flywheel according to a moment of inertia and a speed of the flywheel of the IFW machine;
  controlling the flywheel of the IFW machine to accelerate to a specified speed, and reducing the speed of the flywheel to 0 in a no-load state;
  running an electrical parameter acquisition program to acquire an electrical signal from the Hall sensor; processing and extracting an acquired electrical parameter, and
  calculating a speed function $N_0(t)$ of the flywheel under no load and a time $t_0$ when the speed of the flywheel drops to 0 under no load; and
  calculating an inherent moment $M_0$ of resistance of the IFW machine according to the law of conservation of energy.

7. The working method according to claim 5, further comprising:
  monitoring an instantaneous speed of the flywheel of the IFW machine under preset friction pressure, speed and moment of inertia;
  calculating a speed function $N(t)$ of the flywheel during the welding process and a time $t$ when the speed of the flywheel drops to 0;
  calculating work done by the inherent moment of resistance of the IFW machine during the welding process according to $N(t)$ and $t$; and calculating the energy conversion efficiency during the welding process according to the work done by the inherent moment of resistance during the welding process and the energy stored in the flywheel.

8. A terminal device, comprising a processor and a computer-readable storage medium, wherein the processor is used to implement various instructions; the computer-readable storage medium is used to store a plurality of instructions; the instructions are suitable for being loaded by the processor and executing the calculation process of the working method according to claim 6.

9. A working method based on the system according to claim 2, comprising:
   disposing a Hall sensor beside a flywheel of an IFW machine, so that the flywheel is within a detection range of the Hall sensor;
   disposing a magnet on the flywheel to enable the IFW machine to work;
   allowing a data acquisition module to acquire a Hall electric potential change caused by a relative movement between the magnet and the Hall sensor during an IFW process; and
   enabling a processing module to calculate the energy conversion efficiency of the IFW machine based on the acquired data.

10. A working method based on the system according to claim 3, comprising:
    disposing a Hall sensor beside a flywheel of an IFW machine, so that the flywheel is within a detection range of the Hall sensor;
    disposing a magnet on the flywheel to enable the IFW machine to work;
    allowing a data acquisition module to acquire a Hall electric potential change caused by a relative movement between the magnet and the Hall sensor during an IFW process; and
    enabling a processing module to calculate the energy conversion efficiency of the IFW machine based on the acquired data.

11. A working method based on the system according to claim 4, comprising:
    disposing a Hall sensor beside a flywheel of an IFW machine, so that the flywheel is within a detection range of the Hall sensor;
    disposing a magnet on the flywheel to enable the IFW machine to work;
    allowing a data acquisition module to acquire a Hall electric potential change caused by a relative movement between the magnet and the Hall sensor during an IFW process; and
    enabling a processing module to calculate the energy conversion efficiency of the IFW machine based on the acquired data.

12. The working method according to claim 9, wherein a calculation process comprises:
    calculating kinetic energy stored in the flywheel according to a moment of inertia and a speed of the flywheel of the IFW machine;
    controlling the flywheel of the IFW machine to accelerate to a specified speed and reducing the speed of the flywheel to 0 in a no-load state;
    running an electrical parameter acquisition program to acquire an electrical signal from the Hall sensor;
    processing and extracting an acquired electrical parameter and calculating a speed function $N_0(t)$ of the flywheel under no load and a time $t_0$ when the speed of the flywheel drops to 0 under no load; and
    calculating an inherent moment $M_0$ of resistance of the IFW machine according to the law of conservation of energy.

13. The working method according to claim 10, wherein a calculation process comprises:
    calculating kinetic energy stored in the flywheel according to a moment of inertia and a speed of the flywheel of the IFW machine;
    controlling the flywheel of the IFW machine to accelerate to a specified speed and reducing the speed of the flywheel to 0 in a no-load state;
    running an electrical parameter acquisition program to acquire an electrical signal from the Hall sensor;
    processing and extracting an acquired electrical parameter and calculating a speed function $N_0(t)$ of the flywheel under no load and a time $t_0$ when the speed of the flywheel drops to 0 under no load; and
    calculating an inherent moment $M_0$ of resistance of the IFW machine according to the law of conservation of energy.

14. The working method according to claim 11, wherein a calculation process comprises:
    calculating kinetic energy stored in the flywheel according to a moment of inertia and a speed of the flywheel of the IFW machine;
    controlling the flywheel of the IFW machine to accelerate to a specified speed and reducing the speed of the flywheel to 0 in a no-load state;
    running an electrical parameter acquisition program to acquire an electrical signal from the Hall sensor;
    processing and extracting an acquired electrical parameter and calculating a speed function $N_0(t)$ of the flywheel under no load and a time $t_0$ when the speed of the flywheel drops to 0 under no load; and
    calculating an inherent moment $M_0$ of resistance of the IFW machine according to the law of conservation of energy.

15. The working method according to claim 9, further comprising:
    monitoring an instantaneous speed of the flywheel of the IFW machine under preset friction pressure, speed and moment of inertia;
    calculating a speed function $N(t)$ of the flywheel during the welding process and a time t when the speed of the flywheel drops to 0;
    calculating work done by the inherent moment of resistance of the IFW machine during the welding process according to $N(t)$ and t; and
    calculating the energy conversion efficiency during the welding process according to the work done by the inherent moment of resistance during the welding process and the energy stored in the flywheel.

16. The working method according to claim 10, further comprising:
    monitoring an instantaneous speed of the flywheel of the IFW machine under preset friction pressure, speed and moment of inertia;
    calculating a speed function $N(t)$ of the flywheel during the welding process and a time t when the speed of the flywheel drops to 0;
    calculating work done by the inherent moment of resistance of the IFW machine during the welding process according to $N(t)$ and t; and
    calculating the energy conversion efficiency during the welding process according to the work done by the inherent moment of resistance during the welding process and the energy stored in the flywheel.

17. A terminal device, comprising a processor and a computer-readable storage medium, wherein the processor is used to implement various instructions; the computer-readable storage medium is used to store a plurality of instructions; the instructions are suitable for being loaded by the processor and executing the calculation process of the working method according to claim 7.

\* \* \* \* \*